United States Patent [19]

Chang et al.

[11] Patent Number: 4,957,997
[45] Date of Patent: Sep. 18, 1990

[54] PROCESS FOR CONVERTING POLYKETONES CONTAINING PENDANT FUNCTIONAL GROUPS TO POLYESTERS

[75] Inventors: Biau-Hung Chang, West Chester; Jack Kwiatek, Cincinnati, both of Ohio

[73] Assignee: Quantum Chemical Corporation, New York, N.Y.

[21] Appl. No.: 481,425

[22] Filed: Feb. 16, 1990

Related U.S. Application Data

[63] Continuation-in-part of Ser. No. 416,903, Oct. 4, 1989, Pat. No. 4,929,711.

[51] Int. Cl.$^5$ .............................................. C08G 2/00
[52] U.S. Cl. ..................... 528/220; 528/392; 528/486; 528/489; 528/491; 524/284; 524/364; 524/500; 524/773; 524/881
[58] Field of Search ............... 528/220, 392, 486, 489, 528/491; 524/284, 364, 500, 773, 881

[56] References Cited

U.S. PATENT DOCUMENTS

| | | | |
|---|---|---|---|
| 4,219,676 | 8/1980 | Sanchez et al. | 568/566 |
| 4,483,781 | 11/1984 | Hartman | 252/174.12 |
| 4,752,649 | 6/1988 | Neckers | 560/302 |
| 4,824,591 | 4/1989 | Dyroff et al. | 252/94 |
| 4,866,146 | 9/1989 | Janda et al. | 526/213 |

*Primary Examiner*—John Knight, III
*Assistant Examiner*—Sam A. Acquah
*Attorney, Agent, or Firm*—Kenneth D. Tremain; Gerald A. Baracka

[57] ABSTRACT

A facile process for converting polyketones containing pendant functional groups to polyesters is provided. The process involves reacting the polyketone with an organic peroxyacid oxidizing agent in an inert liquid medium at a temperature from −20° C. to 150° C. to convert substantially all or only a portion of the keto functionality to ester moieties. The polyketones are obtained by copolymerizing carbon monoxide and a vinyl or vinylidene monomer having at least one functional group containing one or more oxygen, nitrogen, sulfur or halogen atoms.

16 Claims, No Drawings

PROCESS FOR CONVERTING POLYKETONES CONTAINING PENDANT FUNCTIONAL GROUPS TO POLYESTERS

CROSS-REFERENCES TO RELATED APPLICATIONS

This is a continuation-in-part of copending application Ser. No. 07/416,903, filed October 4, 1989 U.S. Pat. No. 4,929,711.

BACKGROUND OF THE INVENTION

1. Field of the Invention

The present invention relates to a process for converting polyketones to polyesters. More particularly, the invention involves a process whereby carbonyl (keto) groups in the polymer chain are oxidatively converted to oxycarbonyl (ester) moieties.

2. Background of the Invention

Polyketones, i.e., polymers having carbonyl groups incorporated in the polymer chain, are known and are most commonly produced by polymerizing carbon monoxide with one or more α-olefins. Polyketones of this type derived from ethylene and carbon monoxide were disclosed by Brubaker in U.S. Pat. No. 2,495,286. Numerous other liquid and gas phase procedures utilizing Ziegler and radical catalysts have been described in the prior art for polymerizing carbon monoxide with ethylene and other olefinically unsaturated monomers. A general review of the properties, preparations, reactions and uses of olefin-carbon monoxide copolymers can be found in the Encyclopedia of Polymer Science and Technology, Vol. 9, p. 397–402, John Wiley & Sons, Inc. (1968).

Carbon monoxide is also known to be copolymerizable with a variety of functionalized vinyl monomers to produce polyketones having pendant functional groups. For example, copolymers of carbon monoxide with vinyl halides, most commonly vinyl chloride, are reported by Wescott et al in Macromolecules 17, 2501 (1984), Kawai et al in J. Polym. Sci., A-1 10, 1709 (1972) Weintraub et al in Chem. Ind. 1976 (1965) and in U.S. Pat. No. 3,790,460. The copolymerization of carbon monoxide with styrene and vinyl chloride is disclosed by Kawai et al in J. Polym. Sci., Polym. Chem. Ed. 12, 1041 (1974). Methyl methacrylate, acrylonitrile, vinyl chloride, vinylidene chloride and styrene have also been copolymerized with carbon monoxide using azobisisobutyronitrile catalyst by Otsuka et al in Die Makromolekulare Chemie 103, 291 (1967). Terpolymers of carbon monoxide, ethylene and vinyl acetate are similarly disclosed in U.S. Pat. Nos. 4,172,939, 4,137,382 and 3,780,140. Additionally in U.S. Pat. No. 3,780,140, the terpolymerization of ethylene and carbon monoxide with methyl methacrylate, vinyl propionate, methyl vinyl ether and isobutyl acrylate is disclosed. European Patent Application EP No. 281139A2 discloses terpolymers of ethylene, carbon monoxide and maleic anhydride.

Various procedures are known for the chemical modification of polyketones. U.S. Pat. No. 2,457,271 discloses a method for modifying monoolefin-carbon monoxide copolymers to increase the degree of unsaturation by heating the copolymer in a solution of an organic solvent with a minor amount of an alkali metal hydroxide. The copolymer is reacted until the oxygen content is decreased by at least 5% or the iodine number increased to at least 25. Modification of polyketones (monoolefin-carbon monoxide copolymers) by reaction with hydrazine hydrate and related nitrogen-containing compounds is described in U.S. Pat. No. 2,457,279. A process for reacting polyketones with hydrogen cyanide to prepare polycyanohydrin resins is disclosed in U.S. Pat. No. 2,495,284.

U.S. Pat. No. 2,495,292 discloses the catalytic hydrogenation of monoolefin-carbon monoxide polymers in the presence of a nickel catalyst to reduce the carbonyl groups to secondary alcohol groups and obtain high molecular weight polyhydric alcohols. U.S. Pat. No. 2,846,406 relates to a process for reacting monoolefin-carbon monoxide copolymers with formaldehyde and specific ammonium or amine salts to produce polyamines of relatively high molecular weight. Another process for modifying monoolefin-carbon monoxide copolymers by reaction with hydrazoic acid in the presence of an acid catalyst is disclosed in U.S. Pat. No. 3,068,201.

Processes for producing thermoplastic polymers from polyketones are also disclosed in U.S. Pat. Nos. 3,979,373 and 3,979,374. The products of U.S. Pat. No. 3,979,373 are polymeric furan derivatives obtained by reacting an equimolar alternate copolymer of ethylene and carbon monoxide with a strong acid, e.g. sulfuric, phosphoric, p-toluene sulfonic, etc., at 40°–200° C. The polymeric pyrrollic polymers of U.S. Pat. No. 3,979,374 are obtained by reacting an equimolar alternate copolymer of ethylene and carbon monoxide with a primary monoamine in the presence of strong acid and a solvent at a temperature from 40°–100° C.

U.S. Pat. Nos. 4,616,072 and 4,687,805 disclose halogenating ethylene-carbon monoxide copolymers by contacting said copolymers in a liquid medium and in the presence of an anionic halogenation catalyst selected from Lewis acids and Lewis bases.

The oxidation and chain cleavage of ethylene-carbon monoxide copolymers to produce mixtures of α,ω-dicarboxylic acids ranging from succinic acid through dodecanedioic acid and possibly higher and their corresponding esters is disclosed in U.S. Pat. No. 2,436,269. The oxidation is typically accomplished utilizing nitric acid and a vanadium oxidation catalyst, e.g. vanadium pentoxide or ammonium vanadate. Other oxidizing agents which are disclosed include the higher oxides of nitrogen, chromic acid, permanganates, molecular oxygen or air, or mixtures of these.

It would be highly advantageous if a process were available whereby carbonyl groups incorporated in a polymer chain, such as in the above-described polyketones, could be readily oxidized to ester groups. It would be even more advantageous if this conversion could be accomplished without significant cleavage of the polymer chain, i.e., without substantially altering the molecular weight and molecular weight distribution of the polymer, and without affecting other functionality present in the polymer. It would be still more advantageous if the degree of oxidation could be easily controlled so that substantially all or only a portion of the carbonyl groups could be converted to oxycarbonyl moieties. These and other advantages are realized by the process of the present invention and will be described in more detail to follow.

SUMMARY OF THE INVENTION

The present invention relates to a process for producing polyesters from polyketones by converting, employing an oxidative procedure, the carbonyl groups present in the polymer chain to oxycarbonyl moieties. More specifically, the polyketones which are oxidized have pendant functional groups. The reaction is accomplished without significant chain scission so that the molecular weight and molecular weight distribution of the polymer are not substantially altered.

The process involves contacting a polyketone of molecular weight greater than 1,000 and containing from 0.01 to 50 mole percent carbonyl with an organic peroxyacid oxidizing agent having from 1 to 20 carbon atoms in an inert liquid medium at a temperature from −20° C. to 150° C. The molar ratio of organic peroxyacid to carbonyl can range from 0.1:1 to 30:1 and the weight ratio of the inert liquid medium to polyketone can range from 1:1 to 100:1. Substantially all or only a portion of the carbonyl group present in the polyketone backbone can be converted to ester moieties.

Polyketones oxidized in accordance with the present procedure are typically obtained by polymerizing carbon monoxide with a vinyl or vinylidene monomer. Useful vinyl or vinylidene monomers, generically referred to herein as the functionalized comonomer, correspond to the formula

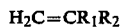

where $R_1$ represents the functional group and $R_2$ is hydrogen, alkyl, aryl, or a second functional group which can be the same or different than $R_1$. Useful functional groups contain one or more oxygen, nitrogen, sulfur or halogen atoms or a combination thereof. In one embodiment of the invention, polyketones which are terpolymers obtained by polymerizing carbon monoxide with a functionalized comonomer and an α-olefin are oxidized.

In a particularly useful embodiment of the invention, the polyketone will have a molecular weight from about 10,000 to 1,000,000 and the carbonyl content will range from 0.5 to 20 mole percent. Organic peroxyacids which are especially useful oxidizing agents include chloro-, fluoro-, and carboxyl-substituted aromatic or aliphatic peroxyacids. These peroxyacids are particularly effective for the process when employed at molar ratios from 2:1 to 15:1 (peroxyacid:carbonyl). The process is highly useful for the conversion of ethylene-vinyl acetate-carbon monoxide terpolymers to the corresponding polyesters.

DETAILED DESCRIPTION OF THE INVENTION

The present invention broadly relates to a process for converting polyketones to polyesters. As employed herein the term polyketone generally refers to polymers having a plurality of carbonyl

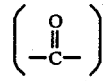

groups in the polymer chain. The carbonyl groups, also referred to herein as ketone or keto groups, may be randomly or uniformly distributed throughout the polymer chain.

The term polyester is used herein in a generic sense and encompasses any polymer having one or more oxycarbonyl

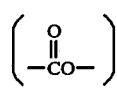

groups in the polymer chain. The polyesters will typically contain a plurality of oxycarbonyl groups, also referred to herein as ester groups; however, less than all of the available carbonyl functionality of the polyketone may be converted to oxycarbonyl. In the latter case, the resulting polyester will contain both oxycarbonyl and carbonyl groups and these polyesters are sometimes referred to herein as poly(keto-esters).

As will be apparent to those skilled in the art, a broad array of useful polyester products, including poly(keto-esters), having functional groups pendant to the polymer backbone can be produced by the present process. It is a highly desirable aspect of the present invention that by judicious selection of the process variables, it is possible to vary the composition of the resulting product with respect to the amount of carbonyl and oxycarbonyl groups present therein thus making it possible "tailor" products to pre-determined specifications and for specific applications.

Considering the reaction of only a single carbonyl group within a polyketone molecule derived from the copolymerization of carbon monoxide with a functionalized comonomer, the process of the present invention can be represented as follows:

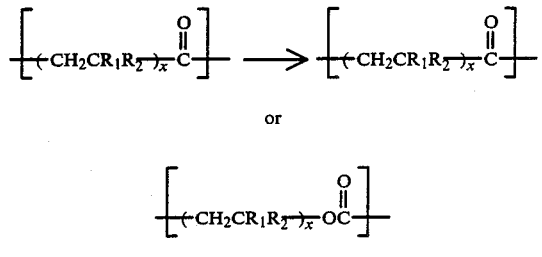

where $R_1$ represents a functional group, $R_2$ represents hydrogen alkyl, aryl or a functional group, and x is an integer representing the number of adjoining comonomer units at a particular CO site. It is evident from the above equation that insertion of the oxygen atom can occur on either side of the carbonyl group.

While it is possible to obtain quantitative conversion of the carbonyl to oxycarbonyl groups, it is not necessary. Substantial amounts of carbonyl functionality may remain and be present in the resulting polyester product. For example, if the above-depicted reaction sequence is adapted to a functionalized polyketone where only a portion of the carbonyl groups in the polyketone produced by the copolymerization of carbon monoxide with a functionalized comonomer is reacted, the reaction showing one possible molecular configuration which could result can be represented as follows:

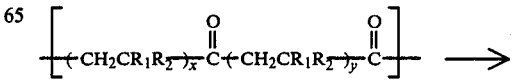

-continued

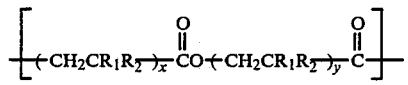

where $R_1$ and $R_2$ are the same as previously defined and x and y are integers, which can be the same or different, representing the number of repeating functionalized comonomer units.

The polyketone polymers utilized for the preparation of the polyesters in accordance with the process of the present invention comprise a hydrocarbon polymer chain backbone having a plurality of carbonyl groups distributed throughout with the carbon atom of the carbonyl being part of the polymer chain backbone. The polymer chain backbone is comprised substantially entirely of carbon atoms. Without regard to any functional groups pendant to the polymer chain backbone, the carbonyl groups may be either randomly or uniformly distributed within the polymer molecule, i.e. along the polymer backbone. The polyketones can structurally be represented as being comprised of repeating units of the structural formula

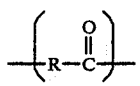

where R represents a bivalent functionalized hydrocarbon moiety.

The molecular weight of the polyketones can range from about 1,000 up to several million or more. It is possible to react extremely high molecular weight polyketones (up to 5 million) in accordance with the present process to convert all or a portion of the carbonyl to ester moieties. Most commonly, the polyketones will have molecular weights from 1,000 to 2,000,000 and, more particularly, from about 10,000 up to about 1,000,000. The carbonyl content, expressed in mole percent, of the polyketones will range from 0.01 up to about 50. Most usually the carbonyl content will range from 0.5 mole percent up to about 20 mole percent.

Useful polyketones can be obtained by any of the known procedures described in the art. The method of preparation of the polyketone plays no role in the process of the invention so long as the polyketone is substantially free of impurities, such as catalyst residues or the like, which might interfere with the oxidation reaction. While the polyketones are most advantageously prepared by copolymerization, other procedures can be utilized. These can include, for example, copolymerization of ethylene with aliphatic aldehydes at high temperature and pressure; oxidation of polyvinylalcohol or polyethylene; cationic polymerization of ketenes or diketenes; radical ring-opening polymerization of unsaturated cyclic ethers or diketens; and radical ring-opening polymerization of 2,2-diphenyl-4-methylene-1,3-dioxolane.

Copolymerization of carbon monoxide and α-olefins or mixtures of α-olefins is commonly utilized to produce the polyketones. Numerous procedures for preparation of these polymers are known and described in the prior art. The α-olefins which are used typically have from 2 to 12 carbon atoms and include aliphatic α-olefins, such as ethylene, propylene, butene-1, isobutylene, hexene-1, octene-1, and α-olefins having aromatic substituents, such as styrene, p-methyl styrene, α-methyl styrene and the like. Polyketones obtained by the polymerization of carbon monoxide and ethylene or the polymerization of carbon monoxide, ethylene and a second α-olefin having from 3 to 8 carbon atoms, particularly propylene, are advantageously utilized in the present process.

The process of the present invention may also be advantageously used with other polymers having carbonyl groups present in the polymer chain and derived from one or more olefinically unsaturated monomers such as styrene; α-methylstyrene; α-olefins; acrylonitrile; acrylamide; vinyl chloride; vinylidene chloride; vinyl acetate; methyl vinyl ketone; vinylpyridine; acrylic acid and esters thereof; methacrylic acid and esters thereof; maleic anhydride and mono- and diesters thereof; and the like.

Polyketones having functional groups pendant to the polymer backbone are similarly generally obtained by copolymerizing carbon monoxide with a functionalized comonomer. Useful functionalized comonomers for this purpose include vinyl and vinylidine monomers corresponding to the general formula $$H_2C=CR_1R_2$$

where $R_1$ represents a functional group containing one or more oxygen, nitrogen, sulfur or halogen atoms or a combination of two or more of these atoms, and $R_2$ is hydrogen, alkyl, aryl, or a functional group as defined for $R_1$. The functional groups $R_1$ and $R_2$ can be a single atom, as in the case of halogen, or a substituted aliphatic or aromatic or heterocyclic moiety. When the functional group is a single halogen atom, it is most commonly chlorine. When both $R_1$ and $R_2$ are functional groups, they can be the same or different.

Representative functional groups include alkoxy; aryloxy; acyl; acyloxy; carboxy and derivatives thereof including salts, esters and amides; nitrile; amine; halo; thioalkyl; pyridyl; pyrroyl; furfuryl; furoyl; thiazoyl; thienyl; and the like. Monomers which can be copolymerized with carbon monoxide to introduce functional groups of the above types include vinyl acetate; vinylacetonitrile; vinyl n-butyl ether; vinyl butyrate; vinyl chloride; vinylidene chloride; acrylonitrile; methyl vinyl ketone; methyl vinyl ether; vinyl isobutyl ether; vinyl pyridine; N-vinylcarbazole; vinyl 2-chloroethyl ether; vinyl 2-ethylhexanoate; vinyl 2-ethylhexyl ether; maleic anhydride; vinyl fluoride; acrylic acid; methacrylic acid; ethyl acrylate; methyl methacrylate; and the like. It should be noted that when the functional group is a ketone, as with vinyl methyl ketone, in addition to oxidizing carbonyl groups present in the polymer chain that all or a portion of the carbonyl of the pendant keto group will also be oxidized to the ester.

Particularly useful polyketones employed in the present process are obtained when the functionalized comonomer is selected from the group consisting of acrylic acid, $C_{1-4}$ alkyl esters of acrylic acid, methacrylic acid, $C_{1-4}$ alkyl esters of methacrylic acid and vinyl $C_{1-4}$-alkanoates. It is even more advantageous if the functionalized comonomer is vinyl acetate, vinyl butyrate, or iso-butyl acrylate.

The functionalized comonomer may be the sole comonomer employed with the carbon monoxide or it may be advantageously polymerized with the carbon monoxide in a mixture of comonomers wherein the mixture is comprised of a functionalized comonomer and an alpha-olefin of the type described above, i.e. $C_{2-12}$ α-olefin. Terpolymers are produced in this manner. Particularly useful polyketone terpolymers containing pendant functional groups are obtained by copolymerizing carbon monoxide with ethylene and a functionalized comonomer selected from the group consisting of acrylic acid, $C_{1-4}$ alkyl esters of acrylic acid, methacrylic acid, $C_{1-4}$ alkyl esters of methacrylic acid and vinyl $C_{1-4}$-alkanoates. When utilizing a terpolymer the amount of carbon monoxide polymerized will be the same as previously described and the balance will be comprised of the functionalized comonomer and the α-olefin present in a molar ratio from 50:1 to 1:50 and, more preferably, 10:1 to 1:10.

Polyketones which can be oxidized in accordance with the present invention and obtained by polymerizing carbon monoxide with functionalized comonomers, alone or in combination with α-olefins, are known and some of these polymers are commercially available. For example, terpolymers of ethylene, carbon monoxide and vinyl acetate are available under the trademark ELVALOY. Copolymers of carbon monoxide and vinyl halides, such as vinyl chloride, can be obtained by the polymerization procedures described in U.S. Pat. No. 3,790,460 and by Wescott, et al Macromolecules 17, 2501 (1984), Kawai et al J. Polym. Sci., A-1 10, 1709 (1972), Weintraub et al Chem. Ind. 1976 (1965). Copolymers of carbon monoxide with styrene or vinyl chloride can be produced in accordance with the procedures of Kawai et al J. Polym. Sci., Polym. Chem. Ed. 12, 1041 (1974). Carbon monoxide can also be copolymerized with methyl methacrylate, acrylonitrile, vinyl chloride, vinylidene chloride or styrene using azobisisobutyronitrile catalyst as described by Otsuka et al in Die Makromolekulare Chemie 103, 291 (1967). The procedures of U.S. Pat. Nos. 4,172,939, 4,137,382 and 3,780,140 can be employed to produce terpolymers of carbon monoxide, ethylene and vinyl acetate and terpolymers of carbon monoxide and ethylene with methyl methacrylate, vinyl propionate, methyl vinyl ether or isobutyl acrylate can be obtained in accordance with the procedure of U.S. Pat. No. 3,780,140.

The physical characteristics of the resulting polyesters are a function of the molecular weight and the molecular weight distribution of the polyketone and the extent of conversion of carbonyl groups to oxycarbonyl groups. These in turn primarily depend on the composition of the polyketone, the reaction conditions, and the amount of oxidizing agent used.

For the process of this invention, the reaction is carried out in an inert liquid medium, that is, a material which is a liquid at the reaction temperature and which does not react with either the polyketone or the polyester and which is not oxidized under the reaction conditions. Additionally, the liquid must be one which is capable of either dissolving or swelling the polymer. While the boiling point of the liquid medium is not critical, the boiling point should not be so high as to make removal of the solvent difficult. The reaction can be run under reflux conditions or in a pressure vessel.

Useful mediums for the reaction include hydrocarbons, chlorinated hydrocarbons, nitrohydrocarbons, carboxylic acids and carboxylic acid esters. Hexane, heptane, octane, benzene, decalin, methylene chloride, chlorobenzene, dichlorobenzene, nitrobenzene and dimethylphthalate are illustrative of the compounds which can be used as the reaction medium for the process. Aliphatic ($C_{5-10}$) hydrocarbons, benzene, chlorinated $C_{1-3}$ aliphatic hydrocarbons, chlorobenzene and dichlorobenzene are particularly advantageous for the process.

The weight ratio of the liquid medium to polyketone can vary over broad limits and generally ranges from 1:1 to 100:1. More preferably the weight ratio of liquid to polyketone will range from 5:1 up to about 50:1.

An oxidizing agent is necessarily utilized for the process and is dispersed or dissolved in the inert liquid medium and contacted with the polyketone. The molar ratio of oxidizing agent to carbonyl group ranges from about 0.1:1 to 30:1 and, most preferably, from 2:1 to 15:1. Organic peroxyacids are employed as the oxidizing agent for the present process. Useful organic peroxyacids for the invention contain from 2 up to about 30 carbon atoms and correspond to the formula

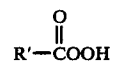

where R' is an aliphatic, cycloaliphatic or aromatic moiety which can be unsubstituted or substituted with one or more halo, nitro or carboxyl groups. When R' is aliphatic, i.e. an alkyl group, it will generally contain from 1 to 19 carbon atoms. When R' is cycloaliphatic, i.e., a cycloalkyl group, it will generally contain from 5 to 19 carbon atoms.

When R' is aromatic, i.e. an aryl group, it will generally contain from 6 to 19 carbon atoms. As previously indicated, any of said alkyl, cycloalkyl or aryl groups can contain halo-, nitro- or carboxyl-substituents. Chloro and fluoro groups are particularly advantageous halo substituents. In a particularly useful embodiment, the organic peroxyacid oxidizing agent is a chloro-, fluoro- or carboxyl-substituted aromatic or aliphatic peroxyacid. Peroxybenzoic acid, m-chloroperoxybenzoic acid, peroxyacetic acid, trifluoroperoxyacetic acid, monoperoxyphthalic acid and monoperoxymaleic acid are representative of the oxidizing agents which can be used. m-Chloroperoxybenzoic acid and monoperoxymaleic acid have been found to be particularly advantageous. The peroxyacid can be used as such, or formed in situ, e.g. by the reaction of maleic anhydride with hydrogen peroxide.

The reaction can be conducted at temperatures from about −20° C. up to about 150° C.; however, it is generally considered most advantageous to carry out the reaction at a temperature from about 20° C. to 100° C. While reaction time will vary depending on the reactants and liquid medium used and the reaction temperature, it can range from 30 minutes under optimal or near optimal conditions up to 24 hours or more where low reaction temperatures and/or low concentrations of reactants are used.

The reaction conditions and time of reaction will be selected based on the degree of conversion of carbonyl to oxycarbonyl desired. As previously pointed out, all or substantially all of the available carbonyl groups of the polyketone can be converted to ester moieties, if desired. However, since it is not necessary to achieve 100% conversion and in certain instances is advantageous to produce poly(keto-esters), i.e., polymer products which contain both oxycarbonyl and carbonyl moieties, the process is generally conducted in such a way that only a portion of the keto functionality is converted to ester groups. This permits the use of reaction times and conditions which minimize or completely eliminate undesirable chain scission reactions. Most commonly the reaction is carried to no more than 90% conversion of the keto groups.

The polyester products prepared in accordance with the invention, whether they contain only oxycarbonyl moieties or both carbonyl and oxycarbonyl groups, are recovered utilizing conventional procedures known to the art. Generally, the polymer solution or polymer dispersion is cooled to ambient conditions to precipitate the polymer which is then recovered by filtration. To facilitate this precipitation, precipitating diluents which are non-solvents for the polyester, i.e. do not dissolve or swell the polymer, can be added. Such precipitating diluents include but are not limited to methanol, ethanol, propanol, t-butanol, acetone and the like. Since excess oxidizing agent and by-products formed as a result of the reaction, e.g. carboxylic acids, may be precipitated with the polyester it may be advantageous to re-dissolve the polymer in a solvent, such as toluene or xylene, and re-precipitate by the addition of one or more of the aformentioned precipitating diluents. The recovered polymer is then dried and, if desired, additives incorporated therein.

It is known that the substrate polyketones, particularly ethylene-carbon monoxide copolymers, exhibit photodegradability due to absorption of radiation by the carbonyl chromophore (Comprehensive Polymer Science, Vol 6, p. 530, Pergamon Press); however, the polyester products obtained according to the present process which result from the partial conversion of carbonyl to oxycarbonyl moieties are both photodegradable and biodegradable. This is a particularly useful combination of properties.

The biodegradable polyesters obtained in accordance with the present process are highly useful as plastics and waxes, the degree of biodegradability increasing with increasing percent conversion of main-chain carbonyl groups to oxycarbonyl moieties. The present products are also useful as adhesives and coatings.

The following examples illustrate the invention more fully; however, they are not intended as a limitation on the scope thereof. In the examples all parts, percentages and ratios are on a weight basis unless otherwise indicated.

EXAMPLE I

Ten grams of a polyketone (ethylene-carbon monoxide) (ECO) copolymer resin powder containing 1.6 wt. % (1.6 mole %) carbon monoxide (Mw 125,000; Mn 18,000) and 2.0 grams m-chloroperoxybenzoic acid (MCPBA) were charged to a flask containing 50 mls heptane and dissolved therein. The ratio of heptane to polyketone was 3.4:1 and the molar ratio of the oxidizing agent to carbonyl (CO) was 2.1:1. The reaction mixture was stirred for 2 hours at 80° C. and then cooled to room temperature. Methanol (250 mls) was added to precipitate the polymer. The polymer was recovered by filtration, washed with methanol and dried at room temperature under vacuum. Analysis of the resulting product by infrared spectroscopy showed a strong absorption at 1735 cm$^{-1}$ attributable to the presence of ester carbonyl. The infrared spectrum also showed a significant decrease in the ketone carbonyl absorption at 1710 cm$^{-1}$ compared to the starting polyketone. Based on the relative heights of the infrared absorption peaks, conversion of carbonyl to oxycarbonyl was calculated to be 90%. Ester formation was also confirmed by nuclear magnetic resonance spectroscopy.

EXAMPLE II

The procedure of Example I was repeated on a larger scale. Reactants used were the same except that the ratio of heptane to ECO copolymer was 2.4:1 and the molar ratio of m-chloroperoxybenzoic acid to carbonyl was 2.0:1. After 2 hours reaction at 80° C. approximately 80% of the carbonyl groups of the polyketone were converted to oxycarbonyl groups. The resulting polyester product (tensile strength at yield 1650 psi, elongation 540%) was useful for the preparation of sheet, film and molded articles.

EXAMPLES III-VIII

To further demonstrate the ability to vary the process, a series of reactions were conducted following the general procedure of Example I. Process details and results obtained, i.e., degree of conversion of carbonyl to oxycarbonyl, are set forth in Table I. It is apparent from the data that a variety of solvents and conditions can be utilized for the oxidation reaction and that a wide variety of polyester products can be produced.

TABLE I

| Example | Molar Ratio MCPBA:CO | Diluent | Diluent:ECO | Reaction Temp (°C.) | Reaction Time (hours) | % Conversion |
|---------|----------------------|---------|-------------|---------------------|-----------------------|--------------|
| III | 13.4:1 | Chlorobenzene | 11.1:1 | 70 | 20 | 80% |
| IV | 6.8:1 | Toluene | 8.7:1 | 50 | 24 | 20% |
| V | 6.8:1 | Ethyl Acetate | 9.0:1 | 70 | 24 | 15% |
| VI | 6.8:1 | Decalin | 9.0:1 | 50 | 24 | 20% |
| VII | 6.8:1 | Dimethylphthalate | 11.9:1 | 70 | 24 | 50% |
| VIII | 6.8:1 | Heptane | 6.8:1 | 70 | 24 | 90% |

EXAMPLE IX

A low molecular weight polyketone was oxidized using monoperoxymaleic acid. The monoperoxymaleic acid was prepared by reacting (1 hour at 40° C. with stirring) 26 mls 30% aqueous hydrogen peroxide with 56.0 grams maleic anhydride in 125 mls methylene chloride. The solid maleic acid formed was collected on a filter and the filtrate containing monoperoxymaleic acid was added to a chlorobenzene solution of the polyketone. The solution was obtained by dissolving 5.0 grams ethylene-carbon monoxide copolymer [powder; 36.6 wt. % (36.6 mole %) carbon monoxide; Mw 3,700; Mn 1,970] in 100 mls chlorobenzene. After stirring for 24 hours at 70° C., the mixture was cooled and filtered and 500 mls methanol added to the filtrate to precipitate the polyester. After washing with methanol, the polyester was dissolved in toluene and re-precipitated using methanol. Conversion of keto functionality to ester functionality was calculated to be 20% based on a comparison of the relative intensities of the infrared absorption peaks.

EXAMPLES X–XIII

A series of low molecular weight ethylene-carbon monoxide (ECO) copolymers of varying carbonyl content were oxidized to the corresponding polyesters in accordance with the general procedure of the invention. In each instance 90% of the carbonyl functionality was converted to oxycarbonyl groups. The oxidizing agent used was m-chloroperoxybenzoic (MCPBA) acid and the diluent was chlorobenzene. Characteristics of the ECO copolymers and reaction particulars are set forth in Table II.

TABLE II

| Example | ECO Mw | Mn | wt %/ mole % CO | Molar Ratio MCPBA:CO | Diluent:ECO | Reaction Temp. (°C.) | Reaction Time (hours) |
| --- | --- | --- | --- | --- | --- | --- | --- |
| X | 2,510 | 1,240 | 13.0/13.0 | 2.1:1 | 11.1:1 | 70 | 24 |
| XI | 2,300 | 1,260 | 3.2/3.2 | 4.4:1 | 11.1:1 | 70 | 24 |
| XII | 2,190 | 1,040 | 5.9/5.9 | 2.7:1 | 7.9:1 | 70 | 16 |
| XIII | 2,270 | 1,130 | 10.0/10.0 | 2.5:1 | 13:1 | 70 | 20 |

EXAMPLE XIV

Ethylene-carbon monoxide copolymer pellets [1.6 wt. % (1.6 mole %) carbon monoxide; Mw 125,000; Mn 18,000] were suspended in 10 mls chlorobenzene with 1.6 grams m-chloroperoxybenzoic acid in a glass vessel. The molar ratio of oxidizing agent to carbonyl was 8.3:1 and the ratio of solvent to copolymer resin was 5.9:1. The container was sealed and rolled for 90 hours on a roller mill under ambient conditions. The swelled polymer pellets (recovered by filtration) were washed with toluene then methanol and purified by dissolving in toluene followed by precipitation with methanol. Infrared analysis of the dried polymer product showed a strong ester carbonyl absorption at 1735 cm$^{-1}$. Based on the relative intensities of the keto and ester peaks the conversion of ketone to ester functionality was calculated to be 35%.

EXAMPLE XV

Ethylene-carbon monoxide copolymer powder [1.6 wt. % (1.6 mole %) carbon monoxide; Mw 125,000; Mn 18,000] was combined with chlorobenzene (weight ratio 7.7:1) and m-chloroperoxybenzoic acid (molar ratio 8.8:1) and stirred for 7 days at room temperature. Approximately fifty percent of the ketone groups of the polyketone converted to ester groups. Expressed in different terms, the resulting polyester product had carbonyl and oxycarboxyl groups, present in essentially a 1:1 ratio randomly distributed throughout the polymer chain.

EXAMPLE XVI

One gram of the polyketone of Example XV was dissolved in 25 mls chlorobenzene by heating at 90° C. The solution was cooled to 65° C. and 3.0 grams maleic anhydride and 2.0 grams 30% aqueous hydrogen peroxide added thereto. The reaction mixture was maintained at 65° C. for 21 hours with stirring after which time the polymer was precipitated by cooling the mixture and the addition of 50 mls. methanol. The recovered polymer was dissolved in 50 mls toluene and reprecipitated using methanol. The infrared spectrum of the dried polymer showed an ester peak at 1735 cm$^{-1}$; the conversion of carbonyl to oxycarbonyl was calculated to be 20%.

EXAMPLE XVII

To further demonstrate the versatility of the process and the ability to oxidize polyketones containing functional groups, a commercially available ethylene-vinyl acetate-carbon monoxide terpolymer sold under the trademark ELVALOY was reacted in accordance with the general procedures. The terpolymer contained 9.5 mole % vinyl acetate and 12.1 mole % carbon monoxide by analysis. For the reaction, 1.0 gram of the terpolymer was dissolved in 15 mls chlorobenzene at 90° C. The solution was then cooled to 65° C. and 3.0 grams m-chloroperoxybenzoic acid (55% purity) added thereto. The mixture was stirred at 65° C. for 20 hours after which time the solution was cooled to room temperature and 100 mls methanol added to precipitate the polymer product. The polymer was recovered by filtration, reprecipitated from toluene and dried at room temperature. Analysis of the recovered product by nuclear magnetic resonance spectroscopy indicated that 99% conversion of carbonyl to oxycarbonyl was achieved.

We claim:

1. A process for converting polyketones having pendant functionality to polyesters comprising contacting a polyketone having to a molecular weight greater than 1,000 and containing 0.01 to 50 mole percent carbonyl group and wherein the pendant functional groups contain one or more oxygen, nitrogen, sulfur or halogen atoms or a combination of said atoms with an organic peroxyacid oxidizing agent having from 2 to 30 carbon atoms in an inert liquid medium at a temperature from −20° C. to 150° C.; the molar ratio of said oxidizing agent to carbonyl ranging from 0.1:1 to 30:1 and the weight ratio of said inert liquid medium to said polyketone ranging from 1:1 to 100:1.

2. The process of claim 1 wherein substantially all of the carbonyl groups of the polyketone are converted to ester moieties.

3. The process of claim 1 wherein only a portion of the carbonyl groups of the polyketone are converted to ester moieties.

4. The process of claim 1 wherein the polyketone is obtained by the polymerization of carbon monoxide with a functionalized comonomer of the formula

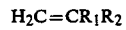

where $R_1$ is a functional group containing one or more of oxygen, nitrogen, sulfur or halogen atoms or a combination of said atoms and $R_2$ is hydrogen, alkyl, aryl, or a functonal group as defined for $R_1$ and which contains 0.5 to 20 mole percent carbonyl group.

5. The process of claim 4 wherein the functionalized comonomer is selected from the group consisting of acrylic acid, $C_{1-4}$ alkyl esters of acrylic acid, methacrylic acid, $C_{1-4}$ alkyl esters of methacrylic acid and vinyl $C_{1-4}$-alkanoates.

6. The process of claim 5 wherein the organic peroxyacid is formed in situ.

7. The process of claim 6 wherein the inert liquid medium is selected from the group consisting of hydrocarbons, chlorinated hydrocarbons, nitrohydrocarbons, carboxylic acids and esters of carboxylic acids.

8. The process of claims 1, 4, and 7 wherein the organic peroxyacid oxidizing agent corresponds to the formula

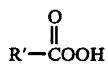

wherein R' is an alkyl group having from 1 to 19 carbon atoms; a cycloalkyl group having from 5 to 19 carbon atoms; an aryl group having from 6 to 19 carbon atoms; a halo-, nitro-, or carboxyl-substituted alkyl group having from 1 to 19 carbon atoms; a halo-, nitro- or carboxyl-substituted cycloalkyl group having from 5 to 19 carbon atoms; or a halo-, nitro-, or carboxyl-substituted aryl group having from 6 to 19 carbon atoms.

9. The process of claim 8 wherein the polyketone has a molecular weight from about 10,000 to about 1,000,000 and the functionalized comonomer is vinyl acetate, vinyl butyrate, or iso-butyl acrylate.

10. The process of claim 9 wherein the reaction is carried out at a temperature from 20° C. to 100° C., the organic peroxyacid oxidizing agent is a chlor-, fluoro- or carboxyl-substituted aromatic or aliphatic peroxyacid, the molar ratio of the peroxyacid to carbonyl ranges from 2:1 to 15:1 and the weight ratio of inert liquid medium to polyketone is from 5:1 to 50:1.

11. The process of claim 10 wherein the polyketone is a terpolymer obtained by copolymerizing carbon monoxide, the functionalized comonomer and a $C_{2-12}$ alpha-olefin.

12. The process of claim 11 wherein the organic peroxyacid oxidizing agent is m-chloroperoxybenzoic acid.

13. The process of claim 11 wherein the organic peroxyacid oxidizing agent is peroxymaleic acid.

14. The process of claim 11 wherein the inert liquid medium is an aliphatic $C_{5-10}$ hydrocarbon, a chlorinated $C_{1-3}$ aliphatic hydrocarbon, benzene, chlorobenzene or dichlorobenzene.

15. The process of claim 11 wherein the terpolymer is obtained by copolymerizing carbon monoxide, the functionalized comonomer and ethylene.

16. The process of claim 15 wherein the functionalized comonomer is vinyl acetate.

* * * * *